(12) United States Patent
Shinohara et al.

(10) Patent No.: US 10,613,265 B2
(45) Date of Patent: Apr. 7, 2020

(54) DISPLAY DEVICE

(71) Applicant: Omron Corporation, Kyoto (JP)

(72) Inventors: Masayuki Shinohara, Kyoto (JP); Gouo Kurata, Kyoto (JP); Norikazu Kitamura, Kyoto (JP); Tsuyoshi Arai, Kyoto (JP); Yuto Mori, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 16/342,272

(22) PCT Filed: Nov. 20, 2017

(86) PCT No.: PCT/JP2017/041695
§ 371 (c)(1),
(2) Date: Apr. 16, 2019

(87) PCT Pub. No.: WO2018/168081
PCT Pub. Date: Sep. 20, 2018

(65) Prior Publication Data
US 2019/0324183 A1      Oct. 24, 2019

(30) Foreign Application Priority Data

Mar. 14, 2017   (JP) ................... 2017-048876

(51) Int. Cl.
*G02B 6/00* (2006.01)
*F21V 8/00* (2006.01)
(Continued)

(52) U.S. Cl.
CPC ............. *G02B 6/0023* (2013.01); *G02B 5/10* (2013.01); *G02B 27/22* (2013.01)

(58) Field of Classification Search
CPC .. G02B 6/0035; G02B 6/0036; G02B 6/0038; G02B 6/0041
See application file for complete search history.

(56) References Cited

U.S. PATENT DOCUMENTS

| 9,703,032 B2* | 7/2017 | Wu ...................... G02B 6/0055 |
| 2009/0168457 A1 | 7/2009 | Lai et al. |
| 2014/0240828 A1 | 8/2014 | Robinson et al. |

FOREIGN PATENT DOCUMENTS

| JP | 2007-11057 A | 1/2007 |
| JP | 2009-216778 A | 9/2009 |

(Continued)

OTHER PUBLICATIONS

International Search Report issued in Application No. PCT/JP2017/041695, dated Feb. 6, 2018 (2 pages).

(Continued)

*Primary Examiner* — Anne M Hines
(74) *Attorney, Agent, or Firm* — Osha Liang LLP (57) ABSTRACT

Provided is a display device that prevents generation of stray light and has excellent visibility. In a display device (1) that makes an image light ray enter from an end face of a light guide plate (14) and emits the image light ray, reflected or refracted by each of a plurality of emission structures (prisms 141) provided on the light guide plate, from a light exit surface (14c) of the light guide plate, a light reflection layer or a light absorption layer is formed on at least one optical surface among optical surfaces provided on the emission structure (the prism 141) except for an optical surface that reflects or refracts the image light ray.

13 Claims, 4 Drawing Sheets

(51) Int. Cl.
*G02B 5/10* (2006.01)
*G02B 27/22* (2018.01)

(56) References Cited

FOREIGN PATENT DOCUMENTS

| | | |
|---|---|---|
| JP | 2011-186332 A | 9/2011 |
| JP | 2016-514283 A | 5/2016 |
| JP | 2016-180776 A | 10/2016 |

OTHER PUBLICATIONS

Written Opinion issued in International Application No. PCT/JP2017/041695, dated Feb. 6, 2019 (8 pages).

* cited by examiner

Evaporation, inkjet, black-painting, etc.

DISPLAY DEVICE

TECHNICAL FIELD

The present invention relates to a display device capable of displaying an image formed in the air. The present invention particularly relates to a display device capable of projecting and displaying an image in the air by using retroreflective reflection.

BACKGROUND ART

An aerial display capable of displaying an image formed in the air without a display is known as a prior art. For example, Patent Document 1 discloses a display device that outputs image display light, emitted from a display element to a light guide, from an outgoing surface of the light guide.

PRIOR ART DOCUMENT

Patent Document

Patent Document 1: Japanese Unexamined Patent Publication No. 2011-186332 (Published on Sep. 22, 2011)"

SUMMARY OF THE INVENTION

Problems to be Solved by the Invention

However, the related art as described above is a spectacle-type display with a configuration where an image is formed on the opposite side of the user's eyes with the light guide interposed therebetween. It is thus different from a configuration where a stereoscopic image display is performed in a general stationary display device, for example.

Although it is conceivable to achieve a stationary type display device with a similar configuration, the problem of stray light is not taken into consideration, and hence it is conceivable that a viewing angle of an image formed by this stray light is narrowed.

An object of one aspect of the present invention is to solve the above problem and provide a display device that prevents generation of stray light and has excellent visibility.

Means for Solving the Problem

In order to solve the above problem, in a display device according to one aspect of the present invention enters an image light ray from an end face of a light guide plate and emits the image light ray, reflected or refracted by each of a plurality of emission structures provided on the light guide plate, from a light exit surface of the light guide plate, a light reflection layer or a light absorption layer is formed on at least one optical surface out of the optical surfaces in the emission structure except for an optical surface that reflects or refracts the image light ray.

Effect of the Invention

According to one aspect of the present invention, an effect is exerted to be able to provide a display device that prevents generation of stray light and has excellent visibility.

MODE FOR CARRYING OUT THE INVENTION

[First Embodiment]

Hereinafter, a first embodiment of the present invention will be described with reference to FIGS. 1 to 4.

(Configuration of Display Device)

Figure 1:
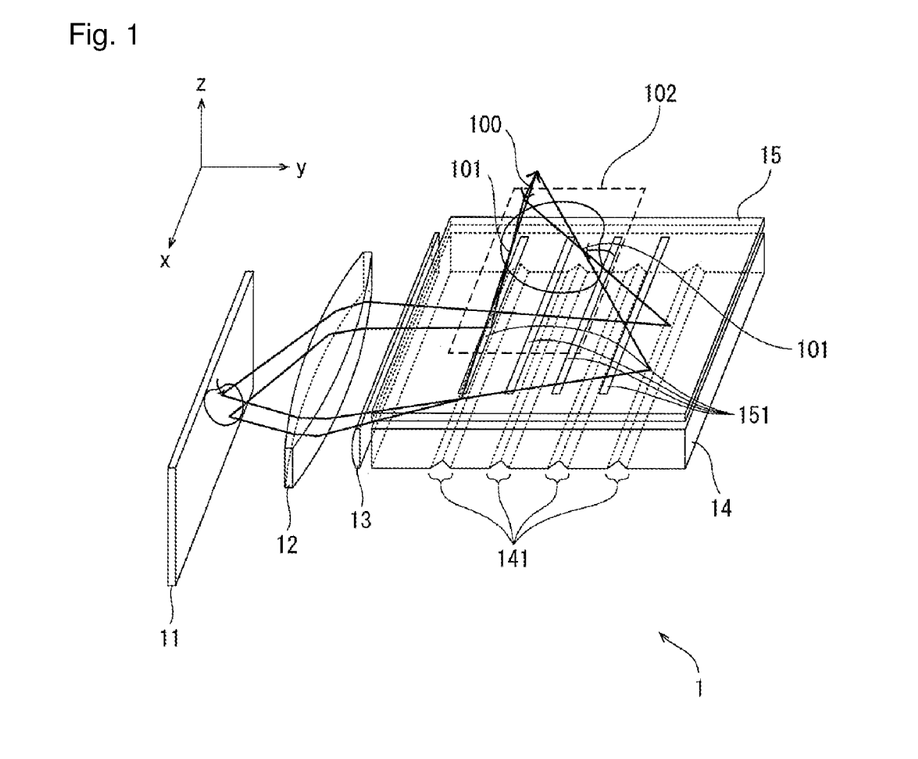
FIG. 1 is a schematic view illustrating an outline of a display device according to a first embodiment of the present invention.
Figure 2:
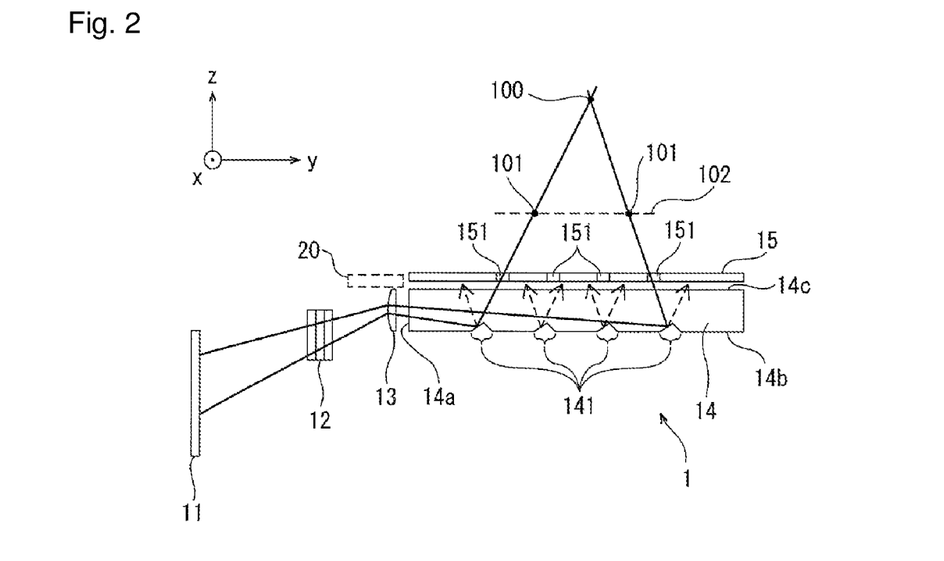
FIG. 2 is a side view illustrating the outline of the display device according to the first embodiment of the present invention.
Figure 3:
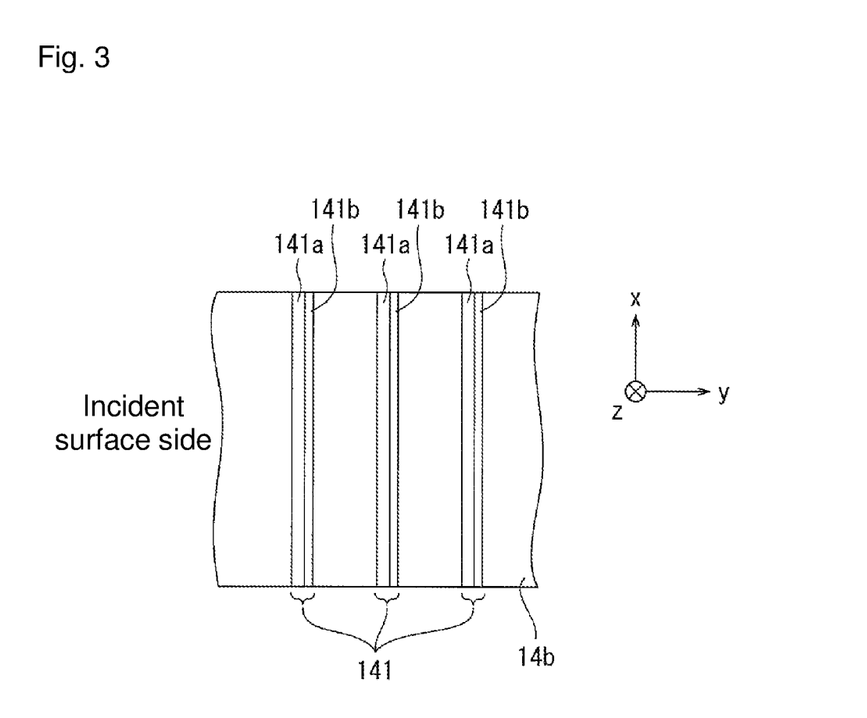
FIG. 3 is a front view of a bottom surface of the light guide plate of the display device according to the first embodiment of the present invention.
Figure 4:
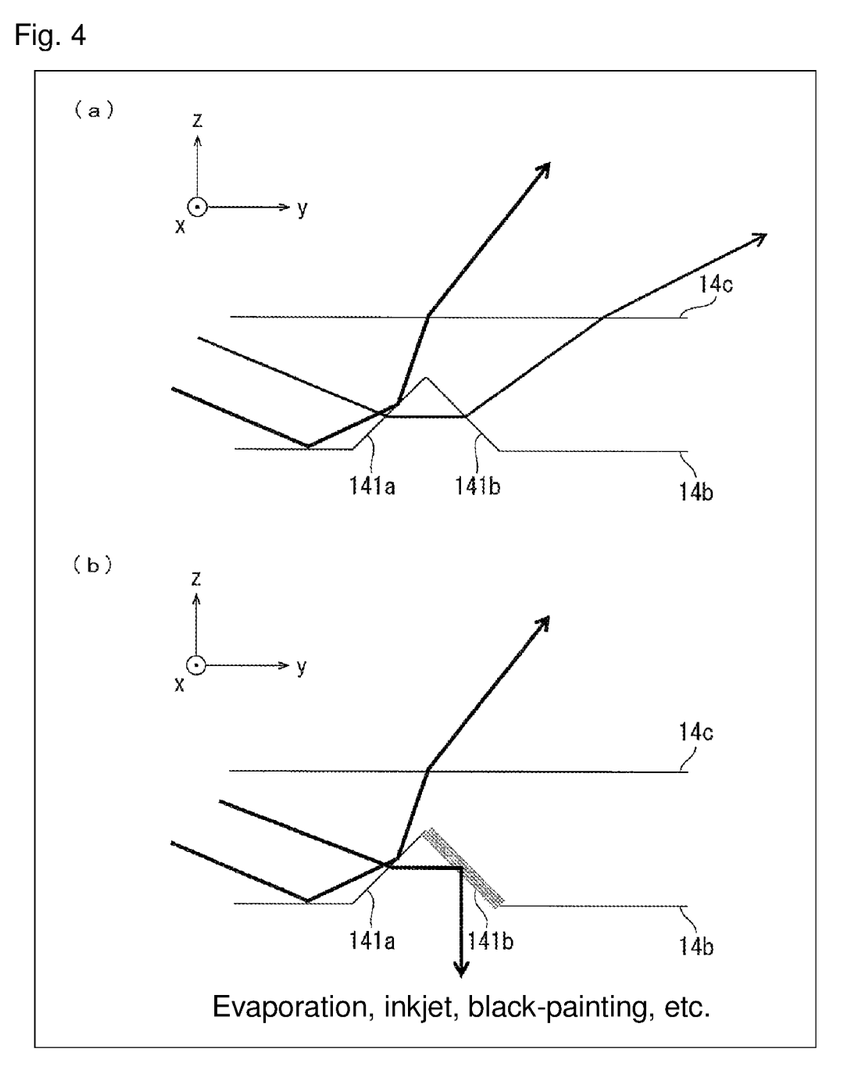
FIGS. 4(a) and 4(b) are schematic views illustrating outlines of light rays emitted from a light exit surface of the light guide plate in the display device according to the first embodiment of the present invention.

An example of a main part configuration of a display device 1 according to the present embodiment will be described with reference to FIGS. 1 to 3. FIG. 1 is a schematic view illustrating an outline of a display device 1 according to the present embodiment. FIG. 2 is a side view illustrating the outline of the display device 1 according to the present embodiment. FIG. 3 is a front view of a bottom surface 14b of a light guide plate 14 of the display device 1 according to the present embodiment.

The display device 1 includes an image display device 11, an imaging lens 12, a collimator lens 13, a light guide plate 14, a prism 141, a mask 15, and a slit 151. Note that the image display device 11, the imaging lens 12, the collimator lens 13, and the light guide plate 14 are sequentially arranged with respect to a Y-axis direction, and the light guide plate 14 and the mask 15 are arranged in this order with respect to a Z-axis direction.

In the illustrated example, a display region of the image display device 11 and an incident surface 14a, which faces the display region, of the light guide plate 14 are both disposed so as to be parallel to an XZ plane. A bottom surface 14b, on which a prism 141 is disposed, of the light guide plate 14, and a light exit surface 14c facing the bottom surface 14b and emitting a light ray to the mask 15 are both disposed so as to be parallel to an XY plane. Further, the surface of the mask 15, on which a slit 151 is provided, is also disposed so as to be parallel to the XY plane. Note that the display region of the image display device 11 and the incident surface 14a of the light guide plate 14 may be disposed so as to face each other, or the display region may be disposed so as to be inclined with respect to the incident surface 14a.

The display device 1 can form an image, which is the image displayed on the image display device 11, on a virtual plane 102 outside the display device 1, thereby projecting the image. Specifically, first, an image light ray output from the display region of the image display device 11 is allowed to pass through the imaging lens 12 and the collimator lens 13, and is then made incident on the incident surface 14a that is the end face of the light guide plate 14. Next, the image light ray incident on the light guide plate 14 propagates inside the light guide plate 14, and is incident on the prism 141 provided on the bottom surface 14b of the light guide plate 14. The image light ray incident on the prism 141 is reflected or refracted in the positive direction of the Z-axis on the prism 141 and is emitted from the light exit surface 14c of the light guide plate 14 which is disposed so as to be parallel to the XY plane. Out of the image light rays emitted from the light exit surface 14c, an image light ray having passed through the slit 151 of the mask 15 forms an image at the image forming point 101 on the plane 102. Hence, the user can view the image projected in the air when looking at the virtual plane 102 from a viewpoint 100. Although the plane 102 is a virtual plane on which the projected image is formed, a screen or the like may be disposed to improve the visibility.

The image display device 11 is, for example, a general liquid crystal display capable of outputting an image light ray by displaying an image in a display region.

The imaging lens 12 is disposed between the image display device 11 and the incident surface 14a. The image light ray output from the display region by the image display device 11 converges on the XY plane parallel to the longitudinal direction of the incident surface 14a and then the imaging lens 12 emits the converged light ray to the collimator lens 13. The imaging lens 12 may be of any kind so long as the image light ray can be converged. For example, the imaging lens 12 may be a bulk lens, a Fresnel lens, a diffractive lens, or the like, or a combination of a plurality of lenses arranged along the Y-axis direction.

The collimator lens 13 is disposed between the image display device 11 and the incident surface 14a and can collimate the image light ray converged on the imaging lens 12, on the YZ plane orthogonal to the longitudinal direction of the incident surface 14a. The collimator lens 13 can emit the collimated image light ray to the incident surface 14a of the light guide plate 14. Similarly to the imaging lens 12, the collimator lens 13 may be a bulk lens or a Fresnel lens. Note that the arrangement order of the imaging lens 12 and the collimator lens 13 may be reversed. Further, the functions of the imaging lens 12 and the collimator lens 13 may be realized by one lens, or may be realized by a combination of many lenses. That is, any lens can be used for the combination of the imaging lens 12 and the collimator lens 13 so long as the image light ray output from the display region by the image display device 11 can be converged on the XY plane and collimated on the YZ plane.

The light guide plate 14 is made of a transparent member, and can receive the image light ray collimated by the collimator lens 13 on the incident surface 14a and emit the image light ray from the light exit surface 14c. In the illustrated example, the light guide plate 14 has an outer shape of a rectangular parallelepiped formed in a flat plate shape, and the surface, which faces the collimator lens 13 and is parallel to the XZ plane, of the light guide plate 14 is defined as the incident surface 14a. The surface parallel to the XY plane and present on the negative direction side of the Z-axis is defined as the bottom surface 14b, and the surface parallel to the XY plane and facing the bottom surface 14b is defined as the light exit surface 14c. Further, the light guide plate 14 includes a plurality of prisms 141.

The plurality of prisms 141 function as emission structures each capable of reflecting or refracting the image light ray incident on the incident surface 14a of the light guide plate 14. In the illustrated example, the plurality of prisms 141 are provided on the bottom surface 14b parallel to the X-axis. Accordingly, the image light ray incident on the incident surface 14a and propagating in the Y-axis direction is reflected or refracted by each of the plurality of prisms 141 provided parallel to the X-axis orthogonal to the Y-axis. The plurality of prisms 141 each may emit image light rays from the light exit surface 14c being one surface of the light guide plate 14 toward the predetermined viewpoint 100, the image light rays having been emitted from different positions in the Z-axis direction orthogonal to the longitudinal direction of the incident surface 14a in the display region of the image display device 11. When the propagation direction of the image light ray is in the Y-axis direction, for example, the plurality of prisms 141 are triangular grooves arranged at predetermined intervals (e.g., 1 mm) in the Y-axis direction and having a predetermined width (e.g., 10 μm) in the Y-axis direction. In the illustrated example, out of the optical surfaces of each of the plurality of prisms 141, the surface closer to the incident surface 14a with respect to the light guiding direction of the image light ray is defined as a reflective surface 141a, and the surface farther from the incident surface 14a is defined as a preliminary surface 141b. In the present embodiment, the preliminary surface 141b is provided with a light reflection layer or a light absorption layer so that a light ray reflected or refracted by the preliminary surface 141b does not reach the image forming point 101 on the plane 102. Details of the light reflection layer or the light absorption layer will be described later.

The mask 15 is made of a material opaque to visible light and has a plurality of slits 151. Out of the light rays emitted from the light exit surface 14c of the light guide plate 14, only the light ray directed to the image forming point 101 on the plane 102 can be transmitted through the mask 15 by using the plurality of slits 151.

Each of the plurality of slits 151 transmits only the light ray directed to the image forming point 101 on the plane 102 out of the light rays emitted from the light exit surface 14c of the light guide plate 14. In the illustrated example, the plurality of slits 151 are provided so as to be parallel to the X-axis. Each of the slits 151 corresponds to any prism 141 out of the plurality of prisms 141.

With the above configuration, in the display device 1 according to the present embodiment, an image light ray emitted from each of the individual points in the display region of the image display device 11 is converged on the XY plane and collimated on the YZ plane, and can then be projected at the image forming point 101 on the plane 102. By performing the above process on all the points in the display region, the display device 1 can project the image, output to the display region of the image display device 11, onto the plane 102.

In a case where the collimator lens 13 is disposed so that the center of the incident surface 14a and the optical axis of the collimator lens 13 coincide with each other in the Z-axis direction, the following problem might occur with the image projected onto the plane 102. That is, light rays, having been emitted from two respective points within the XZ plane orthogonal to the optical axis of the collimator lens 13 and entered the light guide plate 14 through the incident surface 14a, have the same angles with respect to the bottom surface 14b, the two points being equidistant from the optical axis with respect to the Z-axis direction. Hence, the light rays from the two points are reflected by the same prism 141 and goes to the plane 102. This causes a problem where these two points overlap from the viewpoint 100.

Therefore, the image display device 11 is preferably disposed so that the entire display region is located on the positive direction side or the negative direction side of the light guide plate 14 in the Z-axis direction. In the present embodiment, the entire display region of the image display device 11 is disposed on the negative direction side of the light guide plate 14. In this case, in order to increase the amount of light entering the light guide plate 14 from the image display device 11 via the collimator lens 13, the mirror 20 may be disposed in a position indicated by a dotted line in FIG. 2. It is preferable that the mirror 20 be disposed on the side opposite to the image display device 11 across the optical axis of the collimator lens 13 in the Z-axis direction and have a reflective surface parallel to the light exit surface 14c and directed to the image display device 11.

Further, it is understood from the example in FIG. 2 that the image light ray emitted from the point on the positive direction side of the Z-axis in the display region of the image display device 11 is incident on a prism 141 located closer to the image display device 11 than the image light ray emitted from the point on the negative direction side of the Z-axis. The light is then reflected by the prism 141 and transmitted through the slit 151 corresponding to the prism 141.

(Prevention of Ghost Image by Machining of Preliminary Surface)

In the present embodiment, the display device 1 has the configuration where, out of the light rays emitted from the light exit surface 14c of the light guide plate 14, only the light ray directed to the image forming point 101 on the plane 102 is transmitted using the plurality of slits 151. Conversely, when a plurality of slits 151 are not provided, another light ray directed to a point different from the image forming point 101 might be emitted as stray light and an image might be formed at the point different from the image forming point 101 and viewed as a ghost image.

However, even when a plurality of slits 151 are used, depending on the width of the slit 151 or the like, stray light directed to a point different from the image forming point 101 might be transmitted through the slit 151 and form a ghost image.

The principle of generation of stray light, which causes a ghost image, will be described with reference to FIGS. 4(a) and 4(b). FIGS. 4(a) and 4(b) are schematic views illustrating outlines of light rays emitted from the light exit surface 14c of the light guide plate 14 in the display device 1 according to the present embodiment. FIG. 4(a) illustrates an outline of a light ray reflected by the reflective surface 141a and a light ray refracted by the preliminary surface 141b, and FIG. 4(b) illustrates an outline of a light ray reflected by the reflective surface 141a and a light ray reflected by the preliminary surface 141b.

FIG. 4(a) illustrates a case where two parallel light rays propagate in the light guide plate 14 along the Y-axis direction, and are either reflected or transmitted by the reflective surface 141a of the prism 141. In the illustrated example, the light ray reflected by the reflective surface 141a is refracted at the light exit surface 14c and then emitted to the outside. The light ray transmitted through the slit 151 provided in the mask 15 forms an image at the image forming point 101 on the plane 102. On the other hand, the light ray transmitted through the reflective surface 141a once propagates outside the light guide plate 14 and is then incident on the preliminary surface 141b. Then, the light ray refracted by the preliminary surface 141b is further refracted by the light exit surface 14c, then emitted to the outside and becomes stray light. That is, in the illustrated example, prevention of re-entry of the light ray transmitted through the reflective surface 141a from the preliminary surface 141b into the light guide plate 14 leads to prevention of stray light from being generated.

FIG. 4(b) illustrates a case where in the light guide plate 14 having the light reflection layer for reflecting a light lay on the surface of the preliminary surface 141b, similarly to FIG. 4(a), two parallel light rays are either reflected or transmitted by the reflective surface 141a of the prism 141. In the illustrated example, a light ray reflected by the reflective surface 141a forms an image at the image forming point 101 on the plane 102 similarly to FIG. 4(a). On the other hand, the light ray transmitted through the reflective surface 141a once propagates outside the light guide plate 14 and is then incident on the preliminary surface 141b. At this time, the incident light ray is reflected by the light reflection layer provided on the surface of the preliminary surface 141b and is emitted in the negative direction of the Z-axis. It is thereby possible to prevent formation of a ghost image due to stray light in the same direction as where the image is projected.

The light reflection layer provided on the surface of the preliminary surface 141b may be of any kind so long as having a configuration capable of reflecting alight ray. For example, the light reflection layer may be formed by evaporating metal particles or non-metal particles on the surface of the preliminary surface 141b. The light reflection layer is preferably formed of a metal thin film having high reflectance. In addition, the light reflection layer may or may not be formed on the entire surface of the preliminary surface 141b. For example, when the interval between the prisms 141 is a predetermined interval (e.g., 1 mm), the light reflection layer may be provided at the same interval as the predetermined interval.

Therefore, in the display device 1 according to the present embodiment, the image of the image display device 11 can be projected on the plane 102 by using the reflective surface 141a of each of the plurality of prisms 141 provided on the bottom surface 14b of the light guide plate 14 to form a light ray at the image forming point 101 on the plane 102. Further, in the display device 1, formation of a ghost image due to stray light in the same direction as where the image is projected can be prevented using the light reflection layer formed on the bottom surface 141b of the plurality of prisms 141 provided on the bottom surface 14b of the light guide plate 14. This makes it possible to prevent generation of stray light due to a light ray having passed through the optical surface formed with the light reflection layer or the light absorption layer and to prevent formation of a ghost image due to the stray light. Moreover, it is possible to prevent overlap of the projected image and the ghost image, and to view the projected image from a wider viewing angle. An effect is thus exerted to be able to provide a display device that prevents generation of stray light and has excellent visibility.

The light reflection layer may be of any kind as long as it can prevent the formation of a ghost image due to stray light in the same direction as the projected image of the image. For example, the light reflection layer formed on the surface of the preliminary surface 141b may be formed as a light absorption layer that absorbs a light ray on the preliminary surface 141b. At this time, the light absorption layer formed on the surface of the preliminary surface 141b can absorb the light ray transmitted through the reflective surface 141a and incident on the preliminary surface 141b. It is thereby possible to prevent the light ray having passed through the preliminary surface 141b from being emitted from the light exit surface 14c. The light absorption layer may be formed by, for example, coating a black paint such as inkjet that absorbs a light ray.

In the above description, the light guide plate 14 has been configured to have the outer shape of the rectangular parallelepiped. However, the light guide plate 14 may be of any kind so long as having a configuration capable of emitting a light ray incident on the incident surface 14a from the light exit surface 14c and forming an image at the image forming point 101 on the plane 102. For example, the light guide plate 14 may have a shape bent in a curved shape. At this time, the shapes, arrangement, and the like of the plurality of prisms 141 may be appropriately set on the light guide plate 14 so that a light ray can be formed by the image forming point 101.

The image light ray propagating inside the light guide plate 14 may propagate in any manner so long as the image light ray can enter each of the plurality of prisms 141 and be reflected or refracted by the reflective surface of the prism 141 and emitted from the light exit surface 14c. For example, the image light ray may propagate so as to be reflected twice or more on at least one of the light exit surface 14c and the bottom surface 14b and then emitted from the light exit surface 14c.

In the present embodiment, the number and size of the plurality of prisms 141 are not particularly limited, but the total area of the light reflection layer or the light absorption layer formed on the preliminary surface 141b of each prism 141 is preferably 30% or less of the area of the light exit surface 14c.

(Variations of Light Guide Plate)

As illustrated in FIGS. 1 and 2, the description has been mainly given of the configuration where the light guide plate 14 is made of a single member and the plurality of prisms 141 are formed on the bottom surface 14b so as to have a convex shape toward the inside of the light guide plate 14. However, any configuration may be formed so long as the image light ray can be reflected or refracted by the plurality of prisms 141 and emitted from the light exit surface 14c. Variations of the light guide plate 14 that can be used in the display device 1 according to the present embodiment will be described below with reference to FIGS. 5(a) to 5(f). FIGS. 5(a) to 5(f) are outline views illustrating variations of the light guide plate 14 that can be used in the display device 1 according to the present embodiment.

Figure 5:
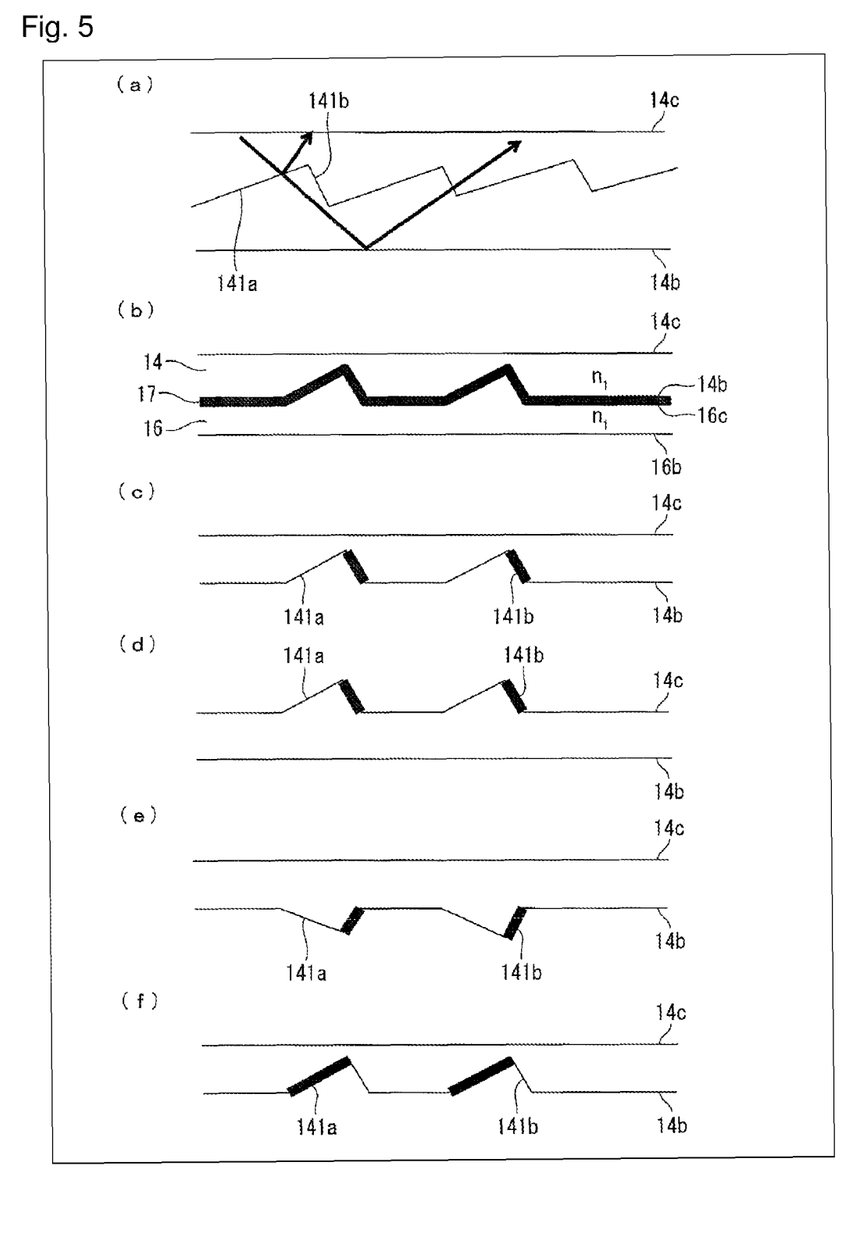
FIGS. 5(a) to 5(f) are outline views illustrating variations of the light guide plate that can be used in the display device according to the first embodiment of the present invention.

FIG. 5(a) illustrates a case where the light guide plate 14 is a combination of two light guide plates. The illustrated example shows, as a first light guide plate 14, the light guide plate 14 having the light exit surface 14c which is flat and the bottom surface 14b formed by only a combination of the reflective surfaces 141a and the preliminary surfaces 141b of the plurality of prisms 141. The illustrated example further shows, as a light guide plate different from the first light guide plate 14, a second light guide plate 16 having a bottom surface 16b which is flat and a light exit surface 16c in a shape fitted to the bottom surface 14b of the first light guide plate 14. The first light guide plate 14 and the second light guide plate 16 are joined so as to be fitted at the bottom surface 14b of the first light guide plate 14. At this time, an image light ray propagating inside the joined light guide plate is reflected or refracted at the boundary surface between the two light guide plates. The illustrated example shows a case where the refractive indices of the two light guide plates are equal, and the image light ray transmitted through the boundary surface can be transmitted without refraction.

By adjusting the refractive indices of the two light guide plates, it is possible to preset the ratio of reflection and refraction of light at the boundary surface. This makes it possible to control, for example, an amount of light of an image formed on the plane. For example, assuming that the refractive index of the second light guide plate 16 is smaller than the refractive index of the first light guide plate 14, the light ray incident on the first light guide plate from the second light guide plate can be reflected at the boundary surface. This makes it possible to prevent generation of stray light due to the light ray incident on the light guide plate 14 from the bottom surface 14b side of the first light guide plate 14.

FIG. 5(b) illustrates a configuration in which the refractive indices of the first light guide plate 14 and the second light guide plate 16 are equal at $n_1$ and an intermediate layer 17 is further provided between the two light guide plates. The intermediate layer 17 may have any configuration so long as being able to transmit a light ray. For example, the intermediate layer 17 may be a semi-transmissive layer that transmits some of incident light rays, or may be a light transmission layer that transmits a light ray and has a refractive index $n_2$ different from the refractive index of the light guide plate 14. In the illustrated example, an angle of incidence on the intermediate layer 17 from the first light guide plate 14 is equal to an angle of refraction on the second light guide plate 16. An angle of incidence on the intermediate layer 17 from the second light guide plate 16 is also equal to an angle of refraction on the first light guide plate 14. That is, the light guide angle of the light incident on the light guide plate remains unchanged while repeating transmission and reflection between the two light guide plates. Therefore, the light emitted from the light exit surface 14c of the first light guide plate 14 does not become stray light.

FIG. 5(c) illustrates a view in which, similarly to FIGS. 1 and 2, a plurality of prisms 141 are formed on the bottom surface of the light guide plate 14 so as to have a convex shape toward the inside of the light guide plate 14 In the illustrated configuration, as described above, out of image light rays, an image light ray propagated inside the light guide plate 14 and reflected by the reflective surface 141a of the prism 141 is emitted from the light exit surface 14c. Further, an image light ray incident on the light reflection layer or the light absorption layer formed on the surface of the preliminary surface 141b can be reflected toward the bottom surface 14b or absorbed.

FIG. 5(d) illustrates a view in which a plurality of prisms 141 are formed on the light exit surface 14c of the light guide plate 14 so as to have a convex shape toward the outside of the light guide plate 14. In the illustrated configuration, an image light ray propagated inside the light guide plate 14 and incident on the reflective surface 141a of the prism 141 is refracted and then emitted to the outside. On the other hand, an image light ray propagated inside the light guide plate 14 and incident on the preliminary surface 141b of the prism 141 is reflected or absorbed toward the bottom surface 14b side by the light reflection layer or the light absorption layer formed on the surface of the preliminary surface 141b.

FIG. 5(e) illustrates a view in which a plurality of prisms 141 are formed on the bottom surface 14b of the light guide plate 14 so as to have a convex shape toward the outside of the light guide plate 14. In the illustrated configuration, an image light ray propagated inside the light guide plate 14 and incident on the reflective surface 141a of the prism 141 is reflected and then emitted to the outside from the light exit surface 14c. On the other hand, an image light ray propagated inside the light guide plate 14 and incident on the preliminary surface 141b of the prism 141 is refracted or absorbed toward the bottom surface 14b side by the light reflection layer or the light absorption layer formed on the surface of the preliminary surface 141b.

FIG. 5(f) is the same as FIG. 5(c), but differs in that the light reflection layer is formed on the surface of the reflective surface 141a. In other words, the light reflection layer is formed on the reflective surface 141a on the side closer to the incident surface 14a with respect to the light guiding direction of the image light ray, out of the optical surfaces of each of the plurality of prisms 141. In the illustrated example, the light guide plate 14 can reflect an image light ray incident on the reflective surface 141a of the prism 141 out of image light rays incident from the incident surface 14a, and can emit the image light ray from the light exit surface 14c to the outside. It is thereby possible to prevent the image light ray from being transmitted at the reflective surface 141a and prevent the image light ray emitted from the reflective surface 141a to the outside from becoming stray light due to being incident again from the preliminary surface 141b and emitted from the light exit surface 14c.

[Modified Examples]

In each of the above embodiments, the display device 1 has been configured to form an image by the image light ray transmitted through the slit 151 of the mask 15 out of the image light rays emitted from the light exit surface 14c. However, the mask 15 and the slit 151 may not be provided so long as the image light ray can be formed at the image forming point 101 on the virtual plane 102. For example, when the light guide plate 14 includes a plurality of prisms 141 on the bottom surface 14b, a light absorption layer may be formed on the light exit surface 14c other than the position corresponding to each prism 141.

In each of the above embodiments, when the prism 141 is formed as illustrated in FIG. 5(c), the image light ray emitted from the light exit surface 14c is the light ray refracted at the reflective surface 141a. Since the refractive index of the light ray in each member constituting the display device 1 generally varies with the temperature of the member, the position at which an image is formed by the image light ray refracted at the reflective surface 141a varies with the temperature of the prism 141. Therefore, the display device 1 may be configured to be able to adjust the position of the slit 151 of the mask 15, for example in accordance with the temperature of the prism 141, for example.

[Summary]

In a display device (1) according to a first aspect of the present invention that makes an image light ray enter from an end face (incident surface 14a) of a light guide plate (14) and emits the image light ray, reflected or refracted by each of a plurality of emission structures (prisms 141) provided on the light guide plate, from a light exit surface (14c) of the light guide plate, a light reflection layer or a light absorption layer is formed on at least one optical surface out of the optical surfaces in the emission structure except for an optical surface that reflects or refracts the image light ray.

According to the above configuration, it is possible to output, from the light exit surface of the light guide plate, a light ray incident on another optical surface different from the optical surface formed with the light reflection layer or the light absorption layer out of the optical surfaces provided on the emission structures. This makes it possible to prevent generation of stray light due to a light ray having passed through the optical surface formed with the light reflection layer or the light absorption layer and to prevent formation of a ghost image due to the stray light. Moreover, it is possible to prevent overlap of the projected image and the ghost image, and to view the projected image from a wider viewing angle. An effect is thus exerted to be able to provide a display device that prevents generation of stray light and has excellent visibility.

A display device (1) according to a second aspect of the present invention may be configured such that in the first aspect, the image light ray propagating inside the light guide plate (14) is reflected twice or more by at least one of the light exit surface (14c) and a bottom surface (14b) facing the light exit surface and then emitted from the light exit surface.

According to the above configuration, as compared with a configuration in which an image light ray propagating inside the light guide plate is not reflected or is reflected once by the light exit surface and the bottom surface, an angle of incident on the bottom surface at the time of making the image light ray incident on the emission structure can be made larger. This enables emission of an image light ray with high resolution from the light exit surface in a wide range of the light guide plate.

A display device (1) according to a third aspect of the present invention may be configured to include, in the second aspect, another light guide plate (16) having a shape fitted with the bottom surface (14b) of the light guide plate (14) and joined to the light guide plate.

According to the above configuration, by adjusting the refractive indices of the light guide plate and the other light guide plate, it is possible to preset the ratio of reflection and refraction of light at the boundary surface. This makes it possible to control, for example, an amount of light of an image formed on the plane.

A display device (1) according to a fourth aspect of the present invention may be configured such that in the third aspect, a refractive index of the other light guide plate (16) is different from a refractive index of the light guide plate (14).

According to the above configuration, a similar effect to that of the display device according to one aspect of the present invention is exerted.

A display device (1) according to a fifth aspect of the present invention may be configured such that in the fourth aspect, the refractive index of the other light guide plate (16) is smaller than the refractive index of the light guide plate (14).

According to the above configuration, the light ray incident on the light guide plate from the other light guide plate is reflected by the boundary surface. This makes it possible to prevent generation of stray light due to the light ray incident on the light guide plate from the bottom surface side.

A display device (1) according to a sixth aspect of the present invention may be configured such that in any one of the first to fifth aspects, the emission structure (prism 141) is formed on the light exit surface (14c) of the light guide plate (14) so as to have a convex shape toward the outside of the light guide plate.

According to the above configuration, when the image light ray is incident on the emission structure formed on the light exit surface of the light guide plate, the light ray refracted by the optical surface can be emitted from the light exit surface.

A display device (1) according to a seventh aspect of the present invention may be configured such that in any one of the first to sixth aspects, the emission structure (prism 141) is formed on the bottom surface (14b) of the light guide plate (14) so as to have a convex shape toward an outside of the light guide plate.

According to the above configuration, when the image light ray is incident on the emission structure formed on the bottom surface of the light guide plate, the light ray reflected by the optical surface can be emitted from the light exit surface.

A display device (1) according to an eighth aspect of the present invention may be configured such that in any one of the first to seventh aspects, the light reflection layer is formed on a surface (reflective surface 141*a*) among the optical surfaces provided in the emission structure (prism 141), the surface being on a side closer to an incident surface with respect to a light guiding direction, and metal particles or nonmetal particles are evaporated on the surface.

According to the above configuration, it is possible to prevent transmission of light rays including the image light ray at the optical surface on the side closer to the incident surface with respect to the light guiding direction. It is thereby possible to prevent the image light ray, after transmitted and emitted to the outside, from being incident again on the light guide plate and emitted from the light exit surface and becoming stray light.

A display device (1) according to a ninth aspect of the present invention may be configured such that in any one of the first to seventh aspects, the light reflection layer is formed on a surface (reflective surface 141*a*) among the optical surfaces provided in the emission structure (prism 141), the surface being on a side farther from an incident surface with respect to a light guiding direction, and metal particles or nonmetal particles are evaporated on the surface.

According to the above configuration, it is possible to prevent transmission of light rays including the image light ray at the optical surface on the side farther from the incident surface with respect to the light guiding direction. It is thereby possible to emit from the light exit surface the image light ray reflected or refracted by the optical surface on the side closer to the incident surface, and at the same time, prevent generation of stray light due to the image light ray reflected or refracted by the optical surface on the side farther from the incident surface.

A display device (1) according to a tenth aspect of the present invention may be configured such that in any one of the first to ninth aspects, the light reflection layer is formed of a metal thin film having a high reflectance.

According to the above configuration, it is possible to prevent transmission of the light ray incident on the metal thin film formed on the light reflection layer and reflect the light ray. This makes it possible to prevent stray light derived from the light ray transmitted through the optical surface where the light reflection layer is formed.

A display device (1) according to an eleventh aspect of the present invention may be configured such that in any one of the first to tenth aspects, the light absorption layer is formed of a black paint that absorbs a light ray.

According to the above configuration, the light ray incident on the light absorption layer can be absorbed. This enables prevention of stray light derived from the light ray transmitted through the optical surface where the light absorption layer is formed.

A display device (1) according to a twelfth aspect of the present invention may be configured such that in the third aspect, the other light guide plate (16) has the same refractive index as the reflective index of the light guide plate (14), and a semi-transmissive layer (intermediate layer 17) is further provided between the light guide plate and the other light guide plate, the semi-transmissive layer transmitting some of incident light rays.

According to the above configuration, an angle of incidence of the light ray incident on the other light guide plate from the light guide plate via the semi-transmissive layer is equal to an angle of refraction on the first light guide plate. Therefore, a plurality of light rays are parallel to each other, the light rays having been reflected by the boundary surface between the other light guide plate and the outside, transmitted again through the semi-transmissive layer, and emitted from the light exit surface, so that no stray light is generated and no ghost image is formed. In addition, some of the light rays are reflected by the semi-transmissive layer and emitted from the light exit surface to form an image at the image forming point. This enables provision of a display device that prevents generation of stray light and has excellent visibility.

A display device (1) according to a thirteenth aspect of the present invention may be configured such that in the third aspect, the other light guide plate (16) has the same refractive index as the reflective index of the light guide plate (14), and the display device further includes a light transmission layer (intermediate layer 17) between the light guide plate and the other light guide plate, the light transmission layer having a refractive index different from the refractive index of the light guide plate.

According to the above configuration, an angle of incidence of the light ray incident on the other light guide plate from the light guide plate via the light transmission layer is equal to an angle of refraction on the first light guide plate. Therefore, a plurality of light rays are parallel to each other, the light rays having been reflected by the boundary surface between the other light guide plate and the outside, transmitted again through the light transmission layer from the other light guide plate, incident on the light guide plate, and emitted from the light exit surface, so that no stray light is generated and no ghost image is formed. In addition, some of the light rays are reflected by the light transmission layer and emitted from the light exit surface to form an image at the image forming point. This enables provision of a display device that prevents generation of stray light and has excellent visibility.

A display device (1) according to a fourteenth aspect of the present invention further includes: an image display device (11) configured to output an image light ray by displaying an image in a display region; a collimator lens (13) disposed between the image display device and an incident surface of the light guide plate and configured to collimate the image light ray in a direction orthogonal to a longitudinal direction of the incident surface; and an imaging lens (12) disposed between the image display device and the incident surface and configured to form an image by the image light ray at a predetermined position with respect to a direction parallel to the longitudinal direction of the incident surface. The display device (1) may be configured such that the plurality of emission structures respectively emit light rays, emitted from positions different from each other in a direction orthogonal to a longitudinal direction of the incident surface in the display region, from the light exit surface toward a predetermined viewpoint, the light exit surface being one surface of the light guide plate.

According to the above configuration, it is possible to view the image formed by the image light ray emitted from the light exit surface at a predetermined viewpoint. That is, the display device can stereoscopically display the image, displayed on the image display device, outside the display device.

The present invention is not limited to each of the embodiments described above, but can be subjected to various changes in the scope shown in the claims. An embodiment obtained by appropriately combining technical units disclosed respectively in different embodiments is also included in the technical scope of the present invention.

DESCRIPTION OF SYMBOLS

1 display device
11 image display device 12 imaging lens
13 collimator lens
14 light guide plate
14a incident surface
14b bottom surface
14c light exit surface
141 prism (emission structure)
141a reflective surface
141b preliminary surface
15 mask
151 slit
16 light guide plate
16b bottom surface
16c light exit surface
17 intermediate layer
20 mirror

The invention claimed is:

1. A display device comprising:
a light guide plate; and
another light plate that has a shape fitted with a bottom surface facing the light exit surface of the light guide plate, and that is joined to the light guide plate; and
a mask that has a plurality of slits, from where a light ray is transmitted through; and
a light reflection layer or a light absorption layer that is formed on at least one optical surface among optical surfaces in the emission structure except for an optical surface that reflects or refracts the image light ray,
wherein the display device makes an image light ray enter from an end face of the light guide plate and emits the image light ray, reflected or refracted by each of a plurality of emission structures provided on the light guide plate, from a light exit surface of the light guide plate.

2. The display device according to claim 1, wherein the image light ray propagating inside the light guide plate is reflected twice or more by at least one of the light exit surface and a bottom surface facing the light exit surface and then emitted from the light exit surface.

3. The display device according to claim 2, wherein a refractive index of the other light guide plate is different from a refractive index of the light guide plate.

4. The display device according to claim 3, wherein the refractive index of the other light guide plate is smaller than the refractive index of the light guide plate.

5. The display device according to claim 1, wherein the emission structure is formed on the light exit surface of the light guide plate so as to have a convex shape toward an outside of the light guide plate.

6. The display device according to claim 1, wherein the emission structure is formed on a bottom surface of the light guide plate so as to have a convex shape toward the outside of the light guide plate.

7. The display device according to claim 1, wherein the light reflection layer is formed on a surface among the optical surfaces provided in the emission structure, the surface being on a side closer to an incident surface with respect to a light guiding direction, and metal particles or nonmetal particles are evaporated on the surface.

8. The display device according to claim 1, wherein the light reflection layer is formed on a surface among the optical surfaces provided in the emission structure, the surface being on a side farther from an incident surface with respect to a light guiding direction, and metal particles or nonmetal particles are evaporated on the surface.

9. The display device according to claim 1, wherein the light reflection layer is formed of a metal thin film having a high reflectance.

10. The display device according to claim 1, wherein the light absorption layer is formed of a black paint that absorbs a light ray.

11. The display device according to claim 1, wherein the other light guide plate has a refractive index same as a refractive index of the light guide plate,
the display device further comprising a semi-transmissive layer between the light guide plate and the other light guide plate, the semi-transmissive layer transmitting some of incident light rays.

12. The display device according to claim 1, wherein
the other light guide plate has a refractive index same as a refractive index of the light guide plate,
the display device further comprising a light transmission layer between the light guide plate and the other light guide plate, the light transmission layer having a refractive index different from the refractive index of the light guide plate.

13. The display device according to claim 1, further comprising:
an image display device configured to output an image light ray by displaying an image in a display region;
a collimator lens disposed between the image display device and an incident surface of the light guide plate and configured to collimate the image light ray in a direction orthogonal to a longitudinal direction of the incident surface; and
an imaging lens disposed between the image display device and the incident surface and configured to form an image by the image light ray at a predetermined position with respect to a direction parallel to the longitudinal direction of the incident surface,
wherein the plurality of emission structures respectively emits light rays, emitted from positions different from each other in the direction orthogonal to the longitudinal direction of the incident surface in the display region, from the light exit surface toward a predetermined viewpoint, the light exit surface being one surface of the light guide plate.

* * * * *